March 3, 1936.  W. STAHLECKER ET AL  2,032,556
TENSION PULLEY
Filed Dec. 21, 1933
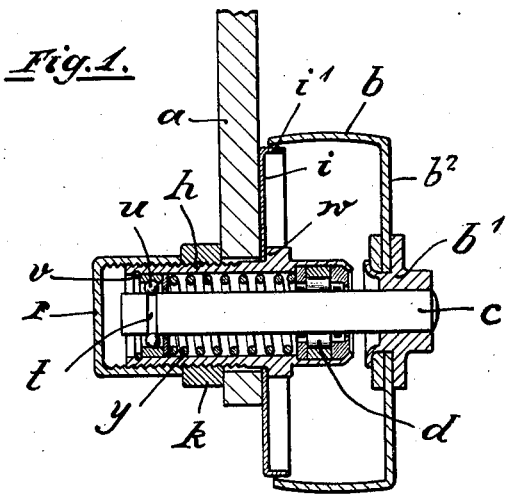
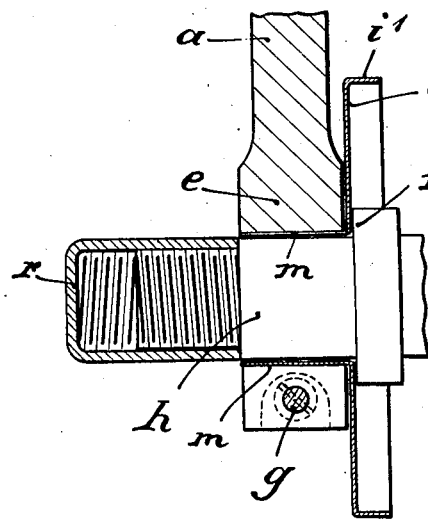
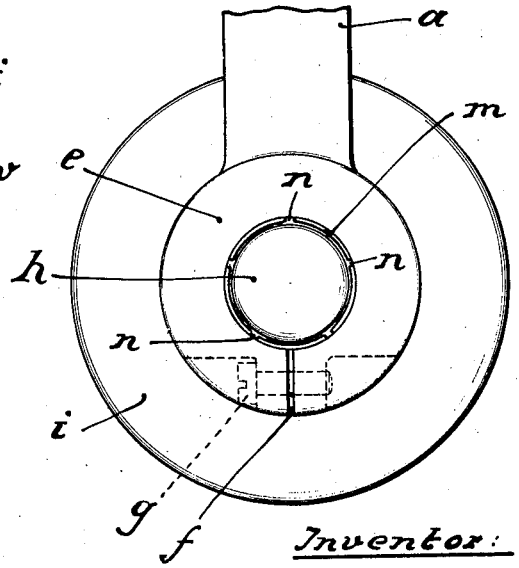
Inventor:
Wilhelm Stahlecker
Erwin Schmid
by Karl Michaelis
Atty.

Patented Mar. 3, 1936

2,032,556

UNITED STATES PATENT OFFICE 2,032,556

TENSION PULLEY

Wilhelm Stahlecker, Cannstatt, and Erwin Schmid, Stuttgart-Gablenberg, Germany, assignors to Vereinigte Kugellagerfabriken Aktiengesellschaft, Schweinfurt, Germany Application December 21, 1933, Serial No. 703,386
In Germany December 27, 1932

9 Claims. (Cl. 308—18)

Our invention relates to tension pulleys or idlers, belt pulleys, rope pulleys and the like designed to rotate at high speed, and more especially to the bearings used to support such pulleys.

It is an object of our invention to provide a bearing for pulleys of the kind described, which is simple and reliable in operation and which has a long life.

It is a further object of our invention to secure the pulley to a cylindrical shaft journaled in two bearings so that the shaft rotates with the pulley. Preferably the journaled members are movably arranged and the two bearings are enclosed in a single casing or the like.

In a preferred embodiment of our invention the bearing is arranged in such manner that a cylindrical roller bearing is located within the zone of maximum load, within the belt receiving face of the pulley, so that a high factor of safety of operation is secured. At the opposite end of the shaft a ball bearing may be provided to take up axial stresses. The two bearings form together a support affording a high factor of safety of operation.

The bearings may be enclosed in a casing formed as a bushing secured in a simple manner to the carrier of the pulley, for instance to an arm, bracket or the like.

It is a still further object of our invention to design the bearing in such manner that its attendance is simplified. In order to accomplish this, the outer race ring of the ball bearing is arranged for axial movement in one direction, so that in order to lubricate the bearing it is merely necessary to shift the shaft a short distance axially. In a preferred embodiment of our invention the outer brass of the ball bearing abuts at one side against a spring, the other end of which may, if desired, abut against the outer brass of the roller bearing.

The bearing according to our invention involves the advantage that the outer brasses of the roller bearing and/or the ball bearing can be readily brought into position. A cover for preventing dust or dirt or the like from entering the interior of the pulley may be provided and clamped in position simultaneously with the other parts of the bearing.

In the drawing affixed to this specification and forming part thereof two embodiments of our invention are illustrated diagrammatically by way of example.

In the drawing

Fig. 1 is a longitudinal section of one embodiment of our invention,

Fig. 2 is a longitudinal section, partly in section, of another embodiment, the right hand portion of the pulley being omitted.

Fig. 3 is an end view of the device shown in Fig. 2.

In the figures similar parts are designated by similar reference characters.

Referring first to Fig. 1, $a$ is the arm or bracket for a pulley $b$, which may be a tension pulley, a belt pulley, a rope pulley or the like. The pulley $b$ is formed hollow as a cup and closed at one side by a wall $b^2$ carrying a hub $b'$. The pulley has an open side closed by a cover $i$ provided with a rim flange $i^1$ projecting with small clearance into the interior of the pulley $b$. The hub $b'$ is fast to one end of the shaft $c$ which extends through the interior of the pulley and beyond the open end thereof. The arm $a$ and the cover $i$ are each provided with a central bore for the reception of a bushing $h$ forming a casing, in which are arranged a cylindrical roller bearing $d$ and a ball collar thrust bearing $u$ for the shaft $c$. The thrust ball bearing is located on the spindle at such a distance that when the parts are in their normal running condition there is an appreciably greater length of shaft between the ball bearing and the roller bearing than there is between the roller bearing and the hub. The rollers of the bearing $d$ engage the shaft $c$ directly in the zone of maximum load, viz. in the interior of the pulley $b$. The inner wall of the bushing $h$ is formed with a suitable recess, into which the outer race ring of the roller bearing $d$ is fitted. The ball bearing $u$ is arranged at the other end of the shaft $c$ and the bushing $h$ is disposed outside of the pulley $b$, at the open side thereof. The inner wall of the bushing is formed with a recess into which a ring $v$ is fitted forming an abutment for the outer race ring of the ball bearing $u$, the balls of which engage a groove $t$ formed near the left hand end of the shaft $c$. If desired, instead of the ring $v$ a shoulder may be provided in the inner wall of the bushing $h$. $y$ is a helical spring surrounding the mid portion of the shaft $c$ and abutting with its ends against the outer rings of the roller bearing $d$ and the ball bearing $u$, respectively. The outer wall of the bushing $h$ is formed with a collar $w$ and its left hand portion is threaded. $k$ is a nut and $r$ is an end cap, both screwed to the outer threaded portion of the bushing $h$.

In operation the bracket $a$, the bore of which receives the bushing $h$, and the cover $i$ are clamped between the collar $w$ and the nut $k$. The bushing $h$ forms a casing for the roller bearing and the ball bearing. This casing is closed by means of the end cap $r$ and is filled with grease or some other suitable lubricating medium. The pulley $b$ and the shaft $c$ rotate in the roller bearing $d$ and the ball bearing $u$. If it is desired to lubricate the ball bearing and the roller bearing, it is merely necessary to pull the pulley $b$ to the right in Fig. 1. By doing this the spring $y$ is contracted and the distance between the ball bearing $u$ and the roller bearing $d$ diminished to the extent that part of the grease contained in the bushing $h$ enters the races of the bearings.

As will be readily understood, the bearings may be lubricated without introducing oil through an oil hole or the like, and this is particularly advantageous in the case where the place at which the pulley is arranged is not easily accessible.

Referring now to Figs. 2 and 3, the nut $k$ shown in Fig. 1 is omitted and the lower portion of the arm $a$ is shaped as a clip $e$ slotted at $f$, a screw $g$ being provided for clamping together the portions of the clip. The cover $i$ is provided with an axial extension $m$ provided with axial slots $n$ and surrounding the mid portion of the bushing $h$ which extends through the clip. By clamping together the end portions of the clip $e$ the bushing $h$ and the cover $i$ are secured in position. Apart from this the construction and operation of this embodiment are exactly the same as Fig. 1.

We wish it to be understood that we do not desire to be limited to the exact details of construction shown and described for obvious modifications will occur to a person skilled in the art.

In the claims affixed to this specification no selection of any particular modification of the invention is intended to the exclusion of other modifications thereof, and changes may be made within the scope of the claims without departing from the spirt of the invention.

Having thus described our invention we claim and desire to secure our Letters Patent:—

1. Pulley bearing comprising a hollow pulley having an end wall, a shaft secured to the end wall of said pulley and extending through and beyond the interior thereof, a roller bearing for said shaft arranged in the interior of said pulley, rollers forming part of said bearing and arranged in direct contact with said shaft, a ball collar thrust bearing for said shaft arranged outside of said pulley, an outer race ring forming part of said thrust bearing, means for preventing axial displacement of said race ring exceeding a predetermined range, an outwardly threaded bushing surrounding said bearings, a shoulder on the outer surface of said bushing, a nut and an inwardly threaded end cap both adapted to be screwed on said bushing, and a support formed with a bore for the reception of said bushing, said support being clamped betwen said nut and the shoulder of said bushing.

2. Pulley bearing comprising a cup-like member, a cover-like member arranged to close the open side of said cup-like member, both members forming a hollow pulley, a shaft secured to the bottom of said pulley and extending through and beyond the interior thereof, a roller bearing for said shaft arranged in the interior of said cup-like member, rollers forming part of said bearing and arranged in direct contact with said shaft, a ball collar thrust bearing for said shaft arranged outside of said pulley, an outer race ring forming part of said thrust bearing, means for preventing axial displacement of said race ring exceeding a predetermined range, an outwardly threaded bushing surrounding said bearings, a shoulder on the outer surface of said bushing, a nut and an inwardly threaded end cap both adapted to be screwed on said bushing, and a support formed with a bore for the reception of said bushing, said support and said cover-like member being clamped between said nut and the shoulder of said bushing.

3. A loose pulley bearing, comprising a hollow pulley formed with a wall at one end and open at the other end, a shaft secured to such end wall extending through the interior of the pulley and beyond the open end thereof, a roller bearing for the shaft located within the interior of the pulley, the rollers of the roller bearing being in direct contact with the shaft, a thrust bearing for the shaft located outside of the pulley beyond the open side thereof, an outwardly threaded bushing surrounding said bearings, a shoulder on the outer surface of said bushing and a nut and an inwardly threaded end cap, both adapted to be screwed on said bushing.

4. A loose pulley bearing, comprising a hollow pulley formed with a wall at one end and open at the other end, a shaft secured to such end wall extending through the interior of the pulley and beyond the open end thereof, a roller bearing for the shaft located within the interior of the pulley, a combined radial and thrust ball bearing for the shaft located outside of the pulley beyond the open end thereof, such bearing including an outer bearing race ring, means for preventing the axial movement of such ring exceeding a predetermined range, the said means being rigid in the direction opposite to the said roller bearing and resilient in the direction toward such roller bearing.

5. A loose pulley bearing, comprising a hollow pulley formed with a wall at one end and open at the other end, a shaft secured to such end wall extending through the interior of the pulley and beyond the open end thereof, a roller bearing for the shaft located within the interior of the pulley, such bearing including an outer race ring and cylindrical rollers contacting directly with the shaft, a combined radial and thrust ball bearing for the shaft located outside of the pulley beyond the open end thereof, the said ball bearing including an outer race ring, means mounted on the shaft for moving the bearing axially therewith, and a housing for the said bearing, it being formed with a shoulder outwardly of the outer race ring of the roller bearing and a shoulder outwardly of the outer race ring of the thrust bearing for limiting its outward movement, and a coiled spring surrounding the shaft and pressing against the inner side of the thrust bearing outer race ring and against the shoulder located outwardly of the race ring of the roller bearing, the organization being such that the pulley and the shaft secured to it and the ball bearing may be moved inwardly permitting the shaft to pass axially through the rollers, compressing the spring and forcing lubricant within the housing into the bearings.

6. A loose pulley bearing, comprising a hollow pulley formed with a wall at one end and open at the other end, a shaft secured to such end wall extending through the interior of the pulley and beyond the open end thereof, a roller bearing for the shaft located within the interior of the pulley, a thrust bearing for the shaft located outside of the pulley beyond the open end thereof and a housing for the said bearings, the thrust bearing being slidable in the housing and a spring disposed between the said bearings for urging the thrust bearing away from the pulley.

7. A loose pulley bearing, comprising a hollow pulley formed with a wall at one end and open at the other end, a shaft secured to such end wall extending through the interior of the pulley and beyond the open end thereof, a roller bearing for the shaft located within the interior of the pulley, the rollers of the roller bearing being in direct contact with the shaft, a thrust bearing for the shaft located outside of the pulley beyond the open end thereof and a housing for the said bearing, the thrust bearing being slidable in the housing and a spring disposed between the said bearings for urging the thrust bearing away from the pulley.

8. A loose pulley bearing, comprising a hollow pulley formed with a wall at one end and open at the other end, a shaft secured to such end wall extending through the interior of the pulley and beyond the open end thereof, a roller bearing for the shaft located within the interior of the pulley, a combined radial and thrust ball bearing for the shaft located outside of the pulley beyond the open end thereof and a housing for the said bearings, the thrust bearing being slidable in the housing and a spring disposed between the said bearings for urging the thrust bearing away from the pulley.

9. In an idler pulley bearing, a bearing sleeve, a high capacity radial bearing, a combined radial and thrust bearing of lower capacity slidable in the sleeve, the said bearings being arranged in spaced relation in said sleeve, there being a spring between the bearings, a closure for one end of the sleeve, the other end being open, the higher capacity bearing being located within the open end of the sleeve, a shaft mounted to rotate in the said bearings and extending outwardly of said high capacity bearing, and a hollow pulley secured to the outward extension of said shaft and surrounding said high capacity bearing.

WILHELM STAHLECKER.
ERWIN SCHMID.